(12) United States Patent
Mizuma et al.

(10) Patent No.: US 6,418,812 B2
(45) Date of Patent: Jul. 16, 2002

(54) BRAKE PEDAL STRUCTURE FOR VEHICLE (75) Inventors: Hiroyuki Mizuma; Sadahiro Kawahara; Tohru Kobayashi; Sunao Gouhara, all of Kanagawa-ken (JP)

(73) Assignees: Nissan Motor Co., Ltd.; Yorozu Corporation, both of Yokohama (JP)

(*) Notice: Subject to any disclaimer, the term of this patent is extended or adjusted under 35 U.S.C. 154(b) by 0 days.

(21) Appl. No.: 09/880,013

(22) Filed: Jun. 14, 2001

Related U.S. Application Data (62) Division of application No. 09/229,314, filed on Jan. 13, 1999, now Pat. No. 6,279,417.

(30) Foreign Application Priority Data

Jan. 13, 1998 (JP) .............................. 10-004954
Jan. 13, 1998 (JP) .............................. 10-005090

(51) Int. Cl.[7] ................................................ G05H 1/14
(52) U.S. Cl. .......................................... 74/512; 74/560
(58) Field of Search ......................... 74/512, 513, 560; 180/274, 275

(56) References Cited

U.S. PATENT DOCUMENTS

| | | | |
|---|---|---|---|
| 5,778,732 A | 7/1998 | Patzelt et al. ............... | 74/512 |
| 5,921,144 A | 7/1999 | Williams, Jr. et al. ........ | 74/512 |
| 6,279,417 B1 * | 8/2001 | Mizuma et al. ............... | 74/512 |

FOREIGN PATENT DOCUMENTS

| | | |
|---|---|---|
| DE | 195 29 347 | 2/1997 |
| EP | 0 805 079 | 11/1997 |
| JP | 6-1113 | 1/1994 |
| JP | 11-59350 * | 3/1999 |
| WO | 97/06036 | 2/1997 |

* cited by examiner

Primary Examiner—David A. Bucci
Assistant Examiner—Vicky A. Johnson
(74) Attorney, Agent, or Firm—Foley & Lardner

(57) ABSTRACT

A brake pedal structure for a vehicle includes a pedal bracket provided on a dash panel of the vehicle, a pedal shaft provided on the pedal bracket, a pedal arm pivotally supported by the pedal shaft in a freely rotatable manner around the pedal shaft as a rotational axis, and a push rod connected to the pedal arm for operating a brake system of the vehicle in response to rotation of the pedal arm. The push rod has a portion so as to interrupt the transmission of a load input at the time of collision of said vehicle.

7 Claims, 7 Drawing Sheets

BRAKE PEDAL STRUCTURE FOR VEHICLE

This is a divisional of Ser. No. 09/229,314 filed Jan. 13, 1999, now U.S. Pat. No. 6,279,417 which issued on Aug. 28, 2001.

BACKGROUND OF THE INVENTION

1. Field of the Invention

This invention relates to a structure of a brake pedal apparatus for vehicle, that is, relates to a brake pedal structure for a vehicle.

2. Description of the Related Art

A brake pedal apparatus for a vehicle is, as shown in Japanese Utility Model Application Laid-Open No. 6-1113, structured such that a pedal bracket supporting an upper end portion of a pedal arm in a freely rotatable manner is fastened to a dash lower panel and a lower surface portion of a dash upper panel connected to the dash lower panel and projecting to a vehicle cabin, and that a push rod connected to the upper end portion of the pedal arm is forward pressed when a driver steps on the pedal arm, thereby operating a Master vac.

When the Master vac or the dash lower panel fixing the Master vac is deformed so as to be backward moved toward the vehicle cabin at a time of a front collision of the vehicle, a rotational force in a direction inverse to a stepping direction of the pedal arm is operated on the pedal arm through the push rod of the Master vac. Accordingly, a stepping position of the pedal arm is rearward shifted and there may be a case that a feeling of physical disorder is generated for the driver.

SUMMARY OF THE INVENTION

An object of the present invention is to provide a brake pedal structure for a vehicle which allows to substantially prevent a collision load from operating on a pedal arm through a push rod typically connected to a Master vac at a time of a front collision of a vehicle so that a driver of the vehicle may not feel physical disorder.

To achieve the above object, a brake pedal structure for a vehicle according to the present invention basically comprises: a pedal bracket provided on a dash panel of the vehicle; a pedal shaft provided on the pedal bracket; a pedal arm pivotally supported by the pedal shaft in a freely rotatable manner around the pedal shaft as a rotational axis; and a push rod connected to the pedal arm for operating a brake system of the vehicle in response to rotation of the pedal arm. Here, this push rod includes a portion so as to interrupt the transmission of a load input at the time of collision of the vehicle.

With this structure, in a normal state, a stepping force is transmitted to a brake system through the push rod by stepping operation of the pedal arm, and a brake operation as in a general brake pedal structure can be conducted. Further, when the push rod retreats due to a head-on collision of the vehicle, the push rod efficiently interrupts the transmission of the load input and thus, it is possible to prevent the collision load from being substantially applied to the pedal arm.

More specifically, the brake pedal structure for a vehicle of the present invention further comprises a connection portion between the pedal arm and the push rod. This connection portion is disposed at a position offset from an arm portion of the pedal arm in a widthwise direction of the vehicle. Also, the push rod is provided at an end of the connection portion rearward of the vehicle with a pin member, and the connection portion comprises a notch, which opens downward of the vehicle and engages the pin member of the push rod to connect the pedal arm and the push rod with each other, and a projection, which is provided on an end of the connection portion forward of the vehicle. Here, the projection of the connection portion pushes the push rod downward of the vehicle to release the engagement of the notch of the connection portion and the pin member of the push rod when a load input in a rearward direction of the vehicle is applied to the connection portion through the push rod at the time of a collision of the vehicle.

With this structure, when the push rod retreats due to the head-on collision of the vehicle, since the push rod is moved downward of the vehicle so as to be disengaged, the transmission of the load input can reliably be interrupted. Further, even after the push rod is disengaged, since the connection portion between the pedal arm and the push rod is disposed at a position offset from the arm portion of the pedal arm in the widthwise direction of the vehicle, it is possible to prevent the push rod from interfering with the arm portion of the pedal arm, and since the push rod is pushed downward, it is possible to prevent the push rod from interfering with other peripheral parts such as the steering member.

Here, it is preferable that the connection portion is a push rod lever integrally connected to the pedal arm. This is because that the offset distance between the connection portion and the arm portion of the pedal arm can be secured sufficiently, and after the push rod is separated, it is possible to reliably prevent the push rod from interfering with the arm portion of the pedal arm.

Further, the opening of the notch of the connection portion includes a pin-drop-preventing portion by which the pin member can separate from the notch when a load input from the pin member which slides in a downward direction of the vehicle exceeds a predetermined value at the time of the collision of the vehicle.

In the case that this structure is employed, as long as the collision load transmitted through the push rod does not exceed the predetermined value due to the head-on collision of the vehicle, the pin-drop-preventing portion can prevent the push rod from being separated, and it is possible to enhance the reliability of the normal state.

Further, it is preferable that the opening of the notch of the connection portion opens downward and forward of the vehicle. When the brake pedal is stepped in the normal state, the notch and the pin member at the rear end of the push rod are engaged with each other deeper as the brake pedal is stepped stronger and therefore, the engagement is not released. However, when the push rod retreats at the time of the head-on collision of the vehicle, the engagement becomes shallower and is prone to be disengaged. Therefore, it is possible to enhance both reliability of the normal state and reliability at the time of collision.

Further, an end of the push rod rearward of the vehicle may be preferably connected to the pedal arm, the pedal arm may be preferably provided at its end forward of the vehicle with a projection. And in such a structure, the pedal arm push the push rod downward of the vehicle to bend the push rod when a load input in a rearward direction of the vehicle is applied to the pedal arm through the push rod at the time of a collision of the vehicle.

With this structure, in a normal state, a stepping force is transmitted to a brake system through the push rod by stepping operation of the pedal arm, and a brake operation as in a general brake pedal structure can be conducted. Further, when the push rod retreats due to a head-on collision of the vehicle, the push rod interrupts the transmission of the load input, it is possible to prevent the collision load from being applied to the pedal arm.

It is also preferable that the push rod includes an easily-bendable portion which is bent if the push rod receives a load input acting in a direction other than an axial direction of the push rod.

Since the easily-bendable portion is provided, when the push rod is pushed down and bent by the projection provided at the front end of the pedal arm, it is possible to further easily bend and deform the push rod, and to reliably prevent the collision load from being applied to the pedal arm.

Here, it is preferable that the projection of the pedal arm abuts against the push rod in the vicinity of the easily-bendable portion when a load input in a rearward direction of the vehicle is applied to the pedal arm through the push rod at the time of the collision of the vehicle. Because the push rod can be bent and deformed more reliably, and it is possible to prevent the collision load from being applied to the pedal arm.

Further, if the structure in which the push rod is bent is employed, it is preferable that the projection of the pedal arm is provided at an end thereof downward of the vehicle with a push rod catching portion extending in a widthwise direction of the vehicle. With this structure, it is possible to surely bend and deform the push rod downward, and to enhance the reliability.

In addition, it is preferable that the push rod is connected to a Master vac of the vehicle because smooth and reliable braking operation in the normal state can be ensured.

BRIEF DESCRIPTION OF THE DRAWINGS

FIG. 4 is an explanatory diagram of the embodiment for explaining an operation when a brake pedal is stepped on;

DETAILED DESCRIPTION OF THE PREFERRED EMBODIMENTS

Each of embodiments of the present invention will be explained in detail below with reference to the accompanying drawings.

A first embodiment of a brake pedal structure for a vehicle of the present invention will be explained first.

In FIGS. 1 to 5, the forward direction of the vehicle is indicated with the arrow FR, the upward direction of the vehicle is indicated with the arrow UP, and the reference numeral 1 represent a brake pedal unit.

The brake pedal unit 1 comprises a pedal arm 2 provided at its lower end with a pedal pad 3, and a pedal bracket 4 for pivotally supporting an upper end of the pedal arm 2 in freely rotatable manner around a pedal shaft 5 as a rotational axis. A rotational force is applied to the pedal arm 2 rearward of the vehicle (counterclockwise direction in FIG. 1) by a return spring S1.

Figure 1:
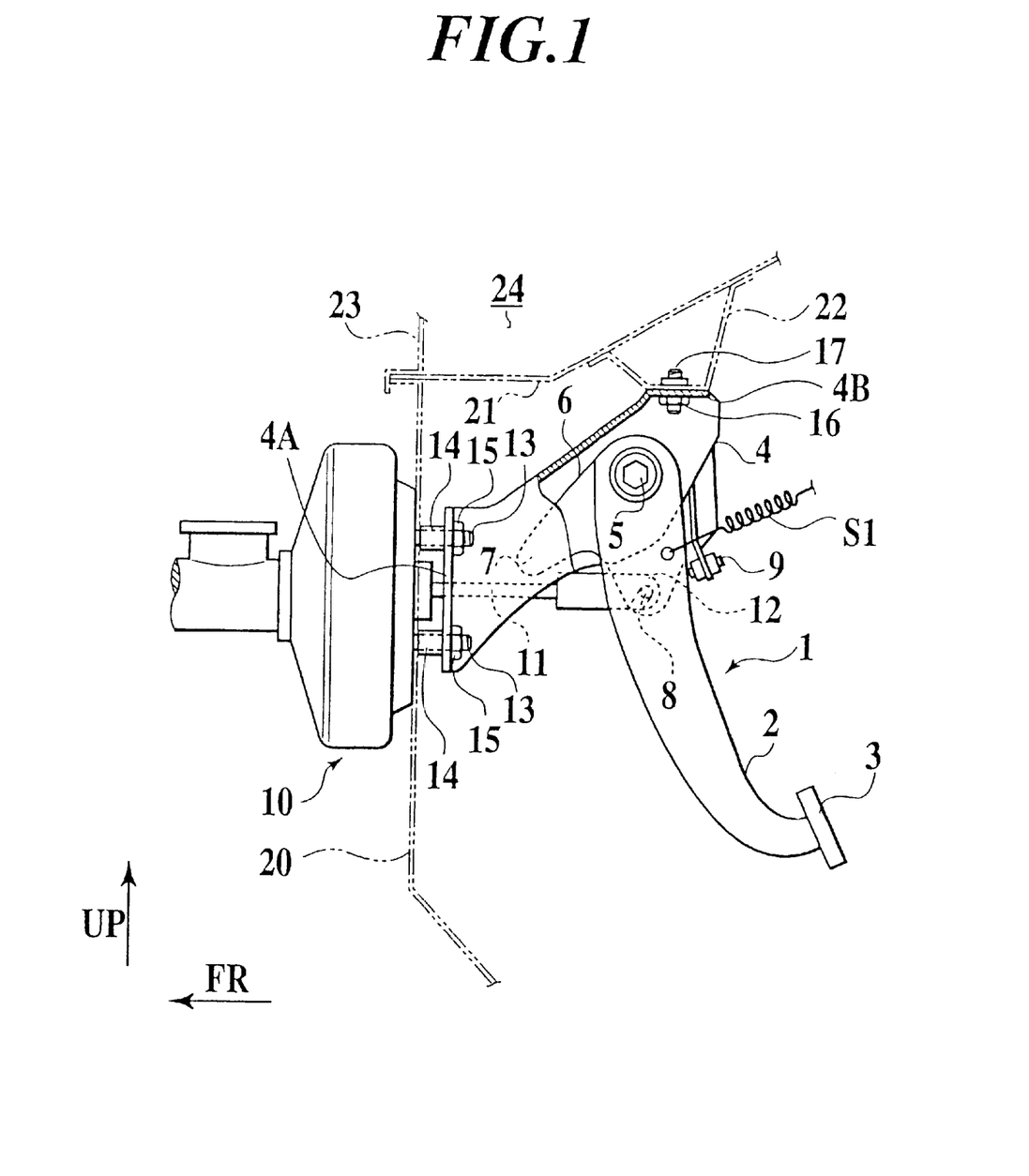
FIG. 1 is a side view, partly in section, showing a first embodiment of a brake pedal structure for a vehicle of the present invention.

The reference number 10 represent a Master vac which is disposed on a side surface of the dash lower panel 20 at the side of an engine room for generating a hydraulic pressure in a brake unit (not shown) by pressing the pedal arm 2 connected to a push rod 11 by stepping. The push rod 11 normally connects between the Master vac 10 and the pedal arm 2.

Here, a connection portion between the push rod 11 and the pedal arm 2 is located at a position offset in a widthwise direction (in a direction perpendicular to the paper surface of FIG. 1) of the vehicle from the arm portion of the pedal arm 2. The connection portion is formed with a notch 8 which is opened downward and forward of the vehicle in a normal state. This notch 8 is engaged with a pin 12 provided on a rear end of the push rod 11 connected to the Master vac 10 so as to connect the push rod 11 and the pedal arm 2 with each other. The connection portion is provided with a projection 7 so that when a rearward force is applied to a front end of the connection portion through the push rod 11 at the time of head-on collision of the vehicle, the projection 7 pushes down the push rod 11 to release the engagement between the push rod 11 and the pedal arm 2.

More specifically, a push rod lever 6 is pivotally supported by the pedal shaft 5 in freely rotatable manner around the pedal shaft 5 as a rotational axis. The pin 12 is engaged with the notch 8 formed at a lower end of a rear portion of the push rod lever 6 for bringing the push rod lever 6 and the push rod 11 into engagement. The push rod lever 6 is provided at its front end with the projection 7 so that when the rearward input is applied to the front end of the connection portion through the push rod 11 at the time of head-on collision of the vehicle, the projection 7 pushes down the push rod 11 to release the engagement between the notch 8 and the pin 12.

Figure 2:
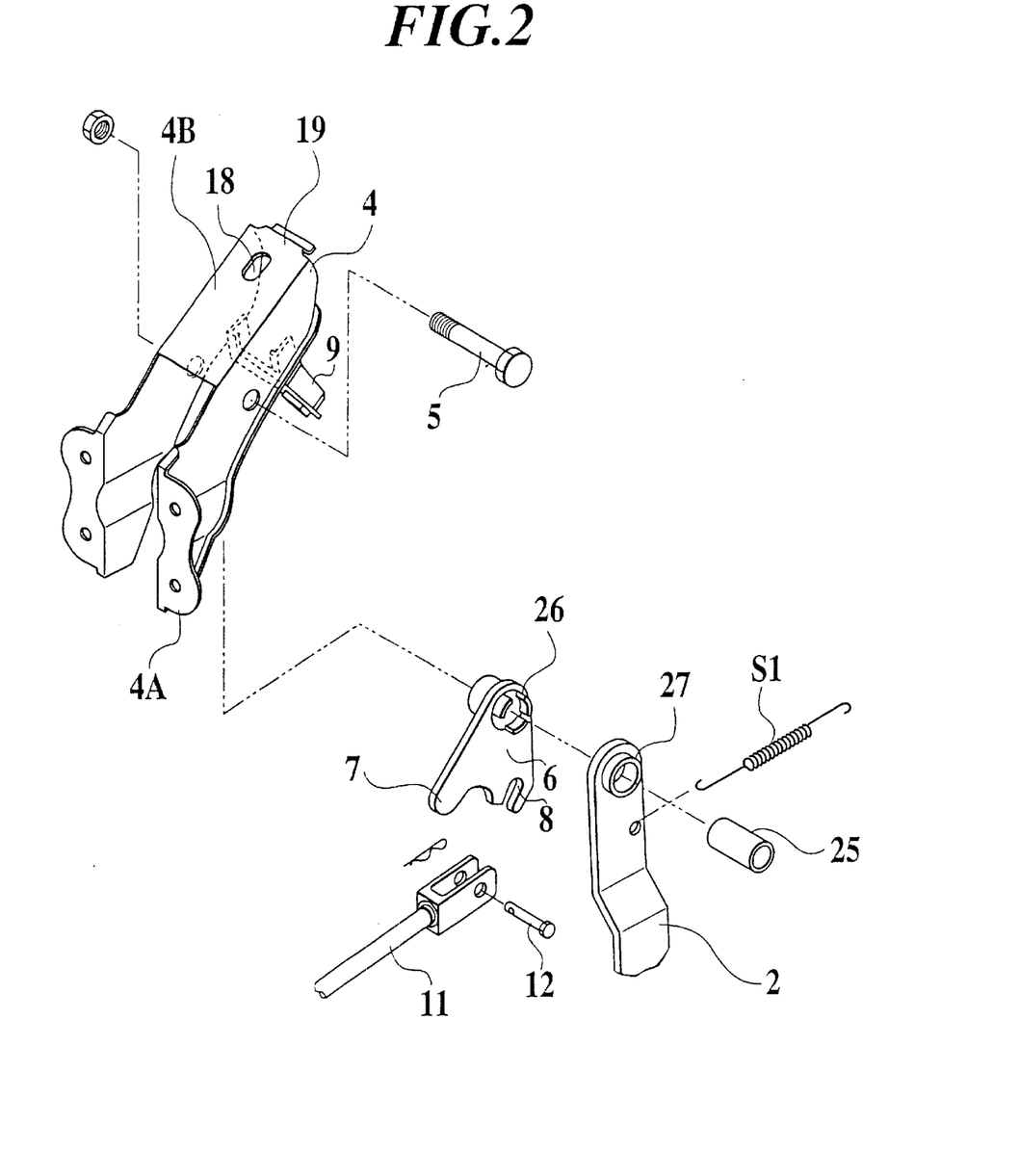
FIG. 2 is an exploded perspective view of the embodiment.

As shown especially in FIG. 2, the pedal arm 2 and the push rod lever 6 are connected at their upper ends to the collar 25 and the pedal shaft 5 is fitted in the collar 25 so that the pedal arm 2 and the push rod lever 6 can rotate integrally.

The Master vac 10 is provided at its rear side surface with a plurality of stud bolts 13, the push rod 11 and the stud bolts 13 are passed through the dash lower panel 20, collars 14 are disposed on projecting portions of the stud bolts 13 at the side of the vehicle cabin, a front wall 4A of the pedal bracket 4 is contacted with the collars 14, and the Master vac 10 and the pedal bracket 4 are attached in the vehicle through the collars 14.

More specifically, in a state where the dash lower panel 20 is sandwiched between the collars 14 and a rear surface of the Master vac 10, the stud bolts 13 are threaded into nuts 15 and fastened, so that the Master vac 10 and the front wall 4A of the pedal bracket 4 are fastened and fixed together to the dash lower panel 20.

Here, a dash upper panel 21 constituting an air box 24 is jointed to an upper end of the dash lower panel 20. The dash upper panel 21 also functions as a framework member of a front waist portion of the vehicle in a widthwise direction of the vehicle in cooperation with a cowl top panel 23.

A vehicle side bracket 22 is jointed to and disposed on a lower surface of the dash upper panel 21, and an upper wall 4B of the pedal bracket 4 is fastened and fixed to the vehicle side bracket 22 by a bolt 16 and a nut 17.

Figure 3:
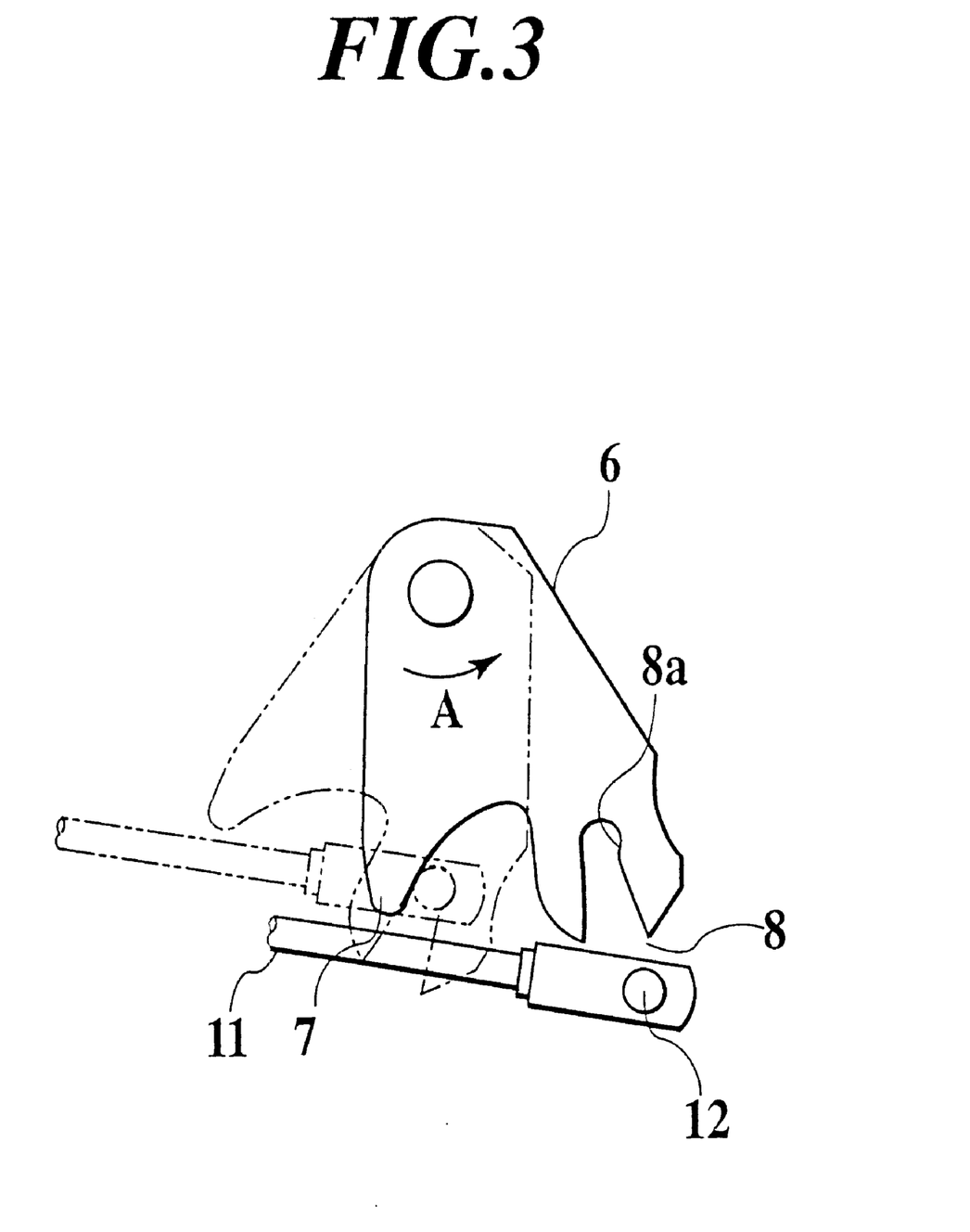
FIG. 3 is an explanatory diagram of the embodiment for explaining a separating operation of a push rod.

In addition, an opening of a lower end of the notch 8 formed in the rear end of the push rod lever 6 is set narrower than a diameter of the pin 12 as a kind of a pin-drop-preventing portion 8a as shown in FIG. 3. That is, the opening prevents the pin 12 from slipping off in a normal state shown with broken lines in FIG. 3, and at the time of the head-on collision of the vehicle, push rod lever 6 rotates in the direction of arrow A, and if an input applied from the pin 12 which slides downward of the vehicle exceeds a predetermined value, the opening opens so that the pin 12 can be separated from the opening.

In FIG. 1, the reference number 9 represents a stopper for restraining the rearward rotation of the pedal arm 2. More specifically, as shown in FIG. 5, an on/off switch 9a for turning on or off a brake lamp is attached to a lower end of the stopper 9, and the rotation of the pedal arm 2 is restrained by abutting a bracket 2a attached to the pedal arm 2 against the switch 9a.

Figure 5:
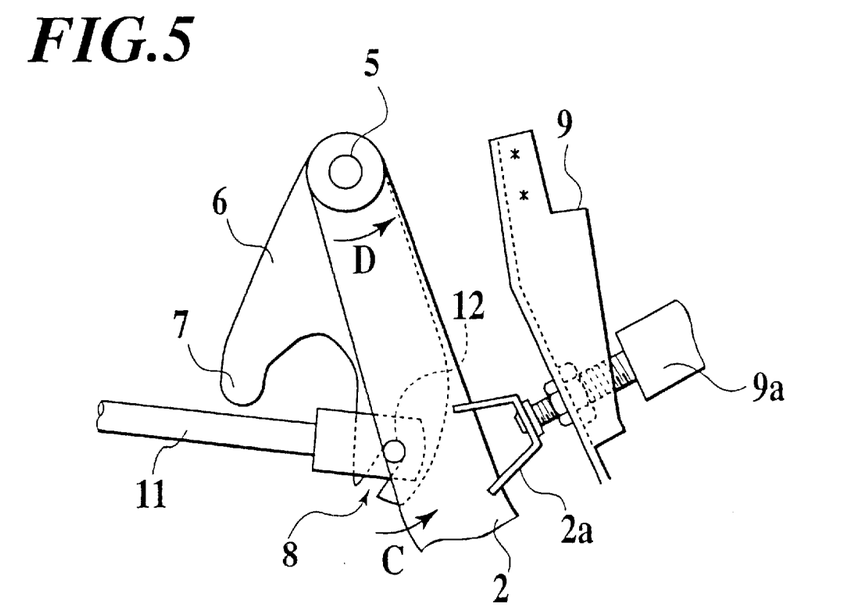
FIG. 5 is an explanatory diagram of the embodiment for explaining an operation when the push rod starts retreating.

This stopper 9 is welded to the pedal bracket as shown with * in FIG. 5, and a strength of the stopper 9 is set such that the stopper is appropriately deformed if it receives a load greater than a predetermined value generated when the vehicle collides head-on and the pedal arm 2 retreats.

In the above described structure, the push rod lever 6 is pivotally supported by the pedal shaft 5 and integrally connected to the pedal arm 2.

The connection portion between the pedal arm 2 and the push rod 11 of the Master vac 10 is disposed at a position offset in the widthwise direction of the vehicle from the arm portion of the pedal arm 2.

More specifically, the push rod lever 6 is formed at its lower end of the portion with the notch 8 which is opened downward and forward, the notch 8 is engaged and connected with the pin 12 provided on the rear end of the push rod 11 of the Master vac 10, and the push rod lever 6 is provided at its front end with the projection 7 which pushes down the push rod 11 to release the engagement between the push rod 11 and the pin 12 when the rearward input is applied to the push rod lever 6 through the push rod 11 at the time of head-on collision of the vehicle.

Figure 4:
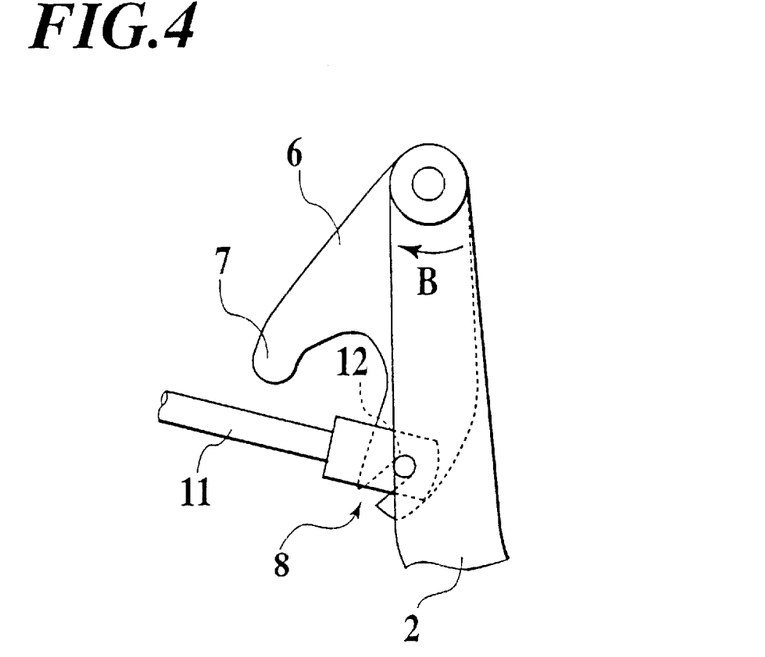

Therefore, in the normal state, the pin 12 provided at the rear end of the push rod 11 deeply engages in the notch 8 as shown in FIG. 4, so that if the pedal arm 2 is stepped to turn the pedal arm 2 in the direction of the arrow B in FIG. 4, the stepping force is reliably transmitted to the Master vac 10 through the push rod 11, and the operation of Master vac as in a general brake pedal structure can be conducted.

Further, if the Master vac 10 is retreated due to the head-on collision of the vehicle, and the push rod 11 is correspondingly retreated in the direction of the arrow C in FIG. 5, a degree of engagement between the notch 8 and the pin 12 provided at the rear end of the push rod 11 becomes shallower, the push rod lever 6 is turned in the direction of the arrow D in FIG. 5, and the projection 7 pushes down the push rod 11 to separate the push rod 11 from the push rod lever 6. Therefore, it is possible to effectively prevent the collision load from being applied to the pedal arm 2.

Further, even after the push rod 11 is separated, since the connection portion between the pedal arm 2 and the push rod 11 is disposed offset from the arm portion of the pedal arm 2 in the widthwise direction of the vehicle, it is possible to prevent the push rod 11 from interfering with the arm portion of the pedal arm 2, and since the push rod 11 is pushed downward, it is possible to prevent the push rod 11 from interfering with other peripheral parts such as the steering member.

More specifically, since the pedal arm 2 and the push rod 11 are connected to each other through the push rod lever 6 which is integrally connected to the pedal arm 2 pivotally supported by the pedal shaft 5, the offset distance between the connection portion, which is disposed between the push rod 11 and the pedal arm 2, and the arm portion of the pedal arm 2 can be secured sufficiently, and after the push rod 11 is separated, it is possible to in reliable prevent the push rod 11 from interfering with the arm portion of the pedal arm 2.

Further, that opening of the notch 8 provided at the lower end of the rear portion of the push rod lever 6 which is the connection portion between the pedal arm 2 and the push rod 11 is provided with the pin-drop-preventing portion 8a which can be separated if the force applied from the pin 12 which slides downward exceeds the predetermined value. Therefore, as long as the collision load transmitted through the push rod 11 does not exceed the predetermined value due to the head-on collision of the vehicle, the pin-drop-preventing portion 8a can prevent the push rod 11 from being separated, and it is possible to enhance the reliability of both the engaging operation and the disengaging operation.

Next, a second embodiment of the brake pedal structure for the vehicle of the present invention will be explained.

Figure 6:
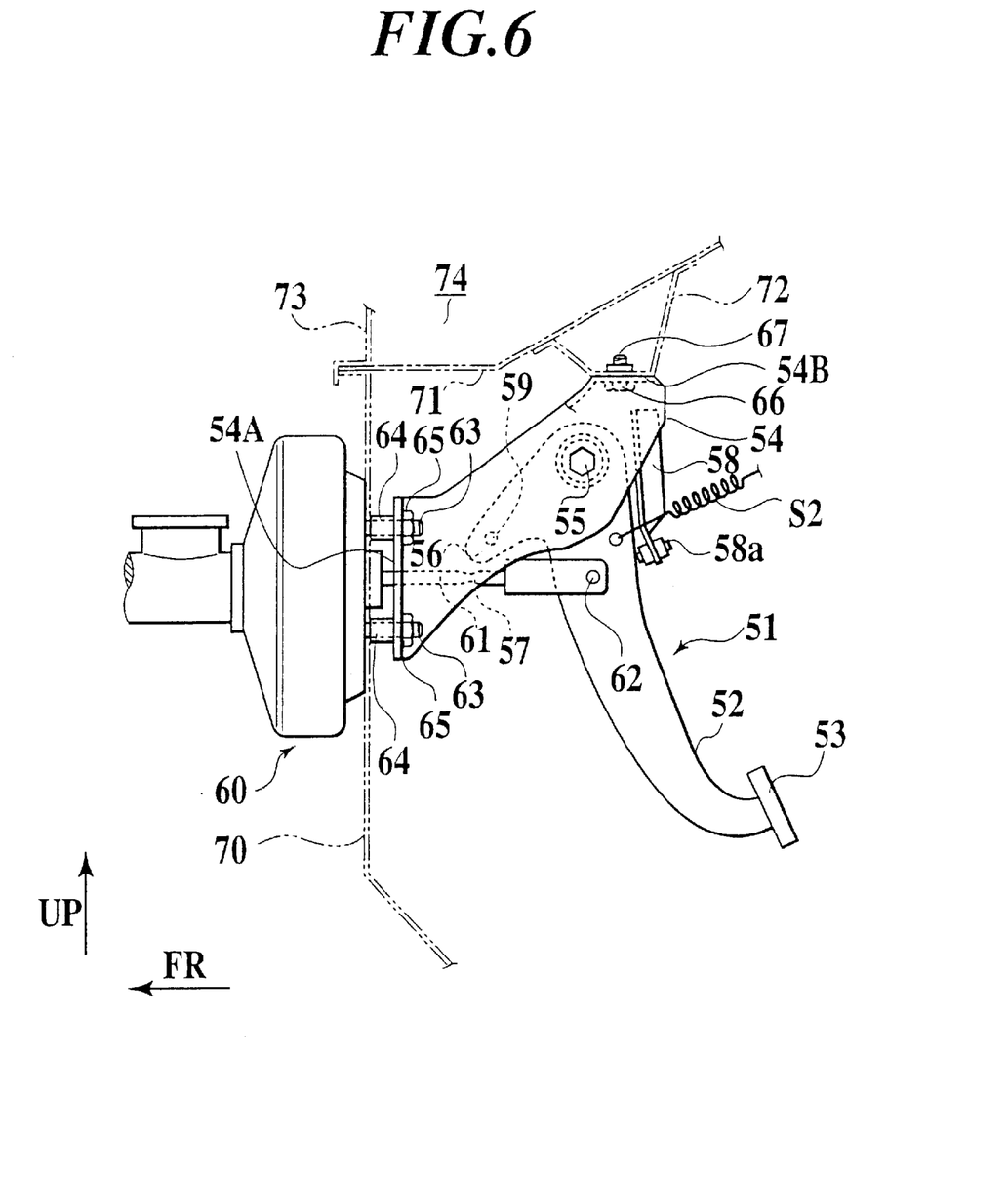
FIG. 6 is a side view, partly in section, showing a second embodiment of a brake pedal structure for a vehicle of the present invention.
Figure 7:
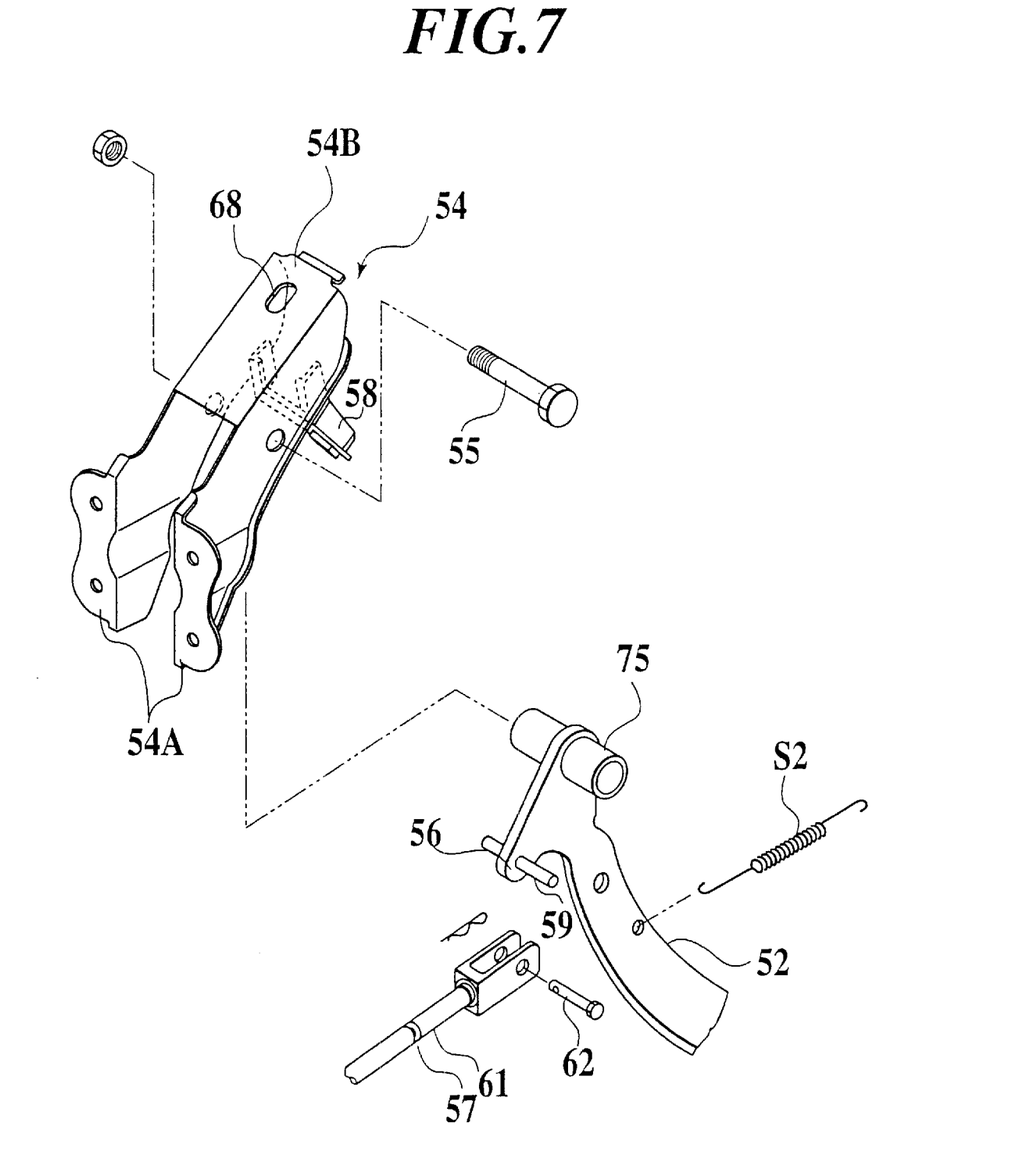
FIG. 7 is an exploded perspective view of the embodiment.
Figure 8:
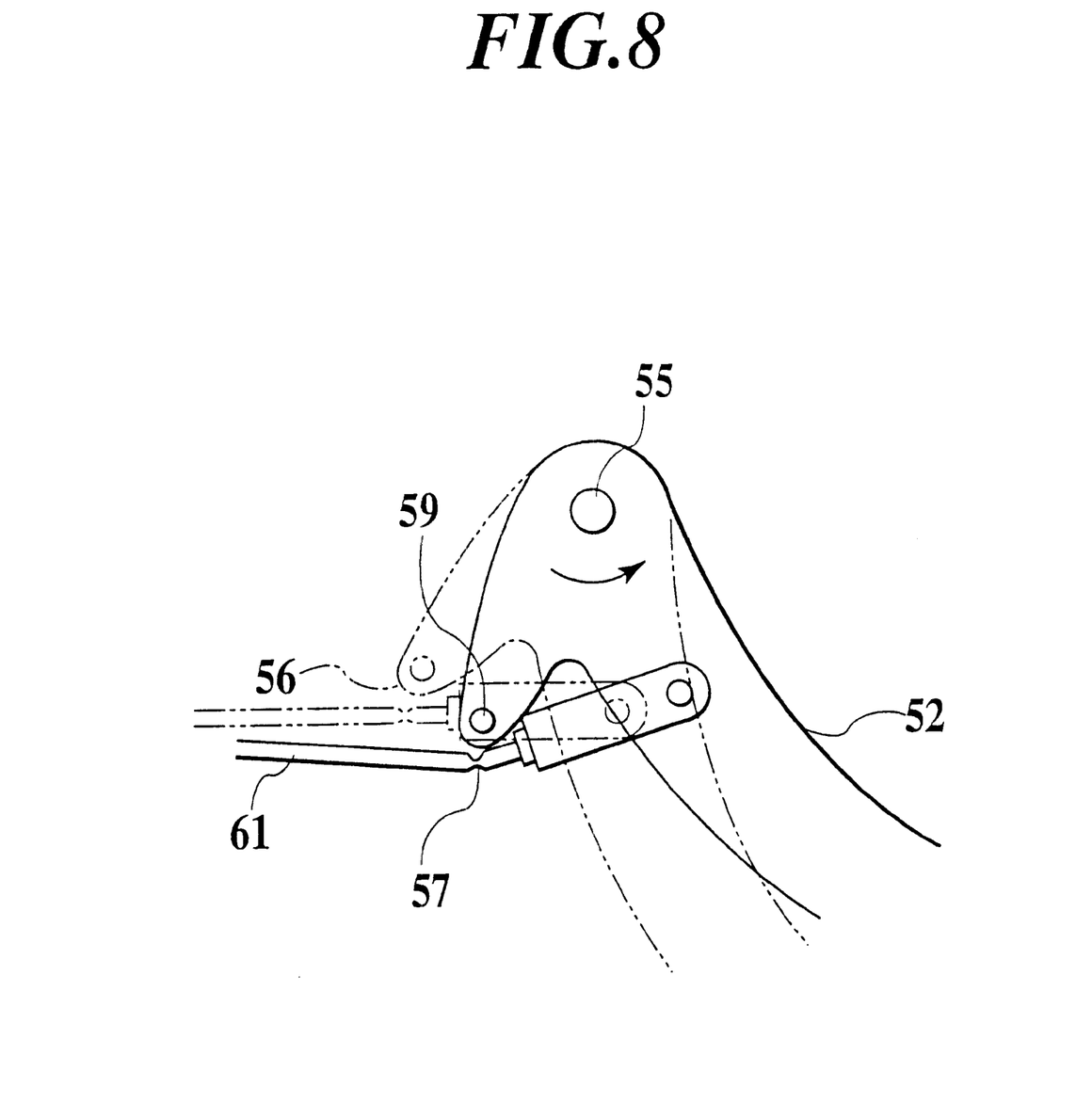
FIG. 8 is an explanatory diagram of the embodiment for explaining a bending deformation of a push rod.

In FIGS. 6 to 8, the forward direction of the vehicle is indicated with the arrow FR, the upward direction of the vehicle is indicated with the arrow UP, and the reference number 51 represents the brake pedal unit.

The brake pedal unit 51 comprises a pedal arm 52 provided at its lower end with a pedal pad 53, and a pedal bracket 54 for pivotally supporting an upper end of the pedal arm 52 in freely rotatable manner around a pedal shaft 55 as a rotational axis. The pedal arm 52 applies the rotational force in the rearward direction of the vehicle which is the counterclockwise direction in FIG. 6 by a return spring S2.

The reference number 60 represent a Master vac which is disposed on a side surface of the dash lower panel 70 at the side of an engine room for generating a hydraulic pressure in a brake unit (not shown) by pressing the pedal arm 52 connected to a push rod 61 by stepping.

A rear portion of the push rod 61 is connected with an upper portion of an arm portion of the pedal arm 52 through a pin 62.

Further, the pedal arm 52 is provided at its front end with a projection 56 at a position below the pedal shaft 55 and above the push rod 61. When the vehicle collides head-on and a rearward force is applied to the pedal arm 52 through the push rod 61, the projection 56 pushes down the push rod 61 to bend and deform it so as to prevent the push rod 61 from propping against the pedal arm 52.

Furthermore, the Master vac 60 is provided at its rear side surface with a plurality of stud bolts 63, and the push rod 61 and the stud bolts 63 are passed through a dash lower panel 70. In a state where a front wall 54A of the pedal bracket 54 is contacted with projecting portions of the stud bolts 63 at the side of the vehicle cabin through collars 64, and the dash lower panel 70 is sandwiched between the collars 64 and the rear side surface of the Master vac 60, the stud bolts 63 are threaded and fastened to nuts 65, thereby fastening the Master vac 60 and the front wall 54A of the pedal bracket 54 to the dash lower panel 70 so that the Master vac 60 and the pedal bracket 54 are fixed to the vehicle.

Here, a dash upper panel 71 constituting an air box 74 is jointed to an upper end of the dash lower panel 70. The dash upper panel 71 also functions as a framework member of a front waist portion of the vehicle in a widthwise direction of the vehicle in cooperation with a cowl top panel 73. A vehicle side bracket 72 is jointed to and disposed on a lower surface of the dash upper panel 71, and an upper wall 54B of the pedal bracket 54 is fastened and fixed to the vehicle side bracket 72 by a bolt 66 and a nut 67.

The push rod 61 has a sufficient strength with respect to a force in the axial direction at the time of normal braking operation. The push rod 61 is provided with an easily-bendable portion 57 having a rod diameter smaller than other portions so as to facilitate the push rod 61 to be bent and deformed when the push rod 61 is pushed down by the projection 56 at the front end of the pedal arm 52 at the time of the head-on collision of the vehicle.

Of course, the projection 56 of the pedal arm 52 is set such that it approaches and abuts against the easily-bendable portion 57 when the rearward force is applied to the push rod 61 at the time of the head-on collision of the vehicle, and the projection 56 is provided at its lower end with pins 59 projecting left and right directions of the vehicle as push rod catching portions.

In FIG. 6, the reference number 58 represents a stopper bracket for restraining the rearward rotation of the pedal arm 52, and the reference number 58a represents a stopper lamp switch which abuts against the pedal arm 52 when the pedal arm 52 is not stepped.

According to the above structure, in a normal state, the projection 56 does not abut against the push rod 61, and the projection 56 is moved in a direction to separate from the push rod 61 when the pedal arm 52 is stepped. Therefore, no force is applied to the push rod 61. Thus, in the normal state, the operation of Master vac 60 that the stepping force is transmitted to the Master vac 60 through the push rod 61 connected to the pedal arm 52 can be conducted as in a general brake pedal structure.

On the other hand, when the vehicle collides head-on, the Master vac 60 retreats, the push rod 61 correspondingly retreats as in FIG. 8 showing that a state indicated with broken lines is changed to a state indicated with solid line, and the pedal arm 52 is rotated in rearward direction of the vehicle shown with arrow in FIG. 8 while deforming the stopper bracket 58. However, the projection 56 downwardly moves and abuts against the push rod 61 so as to bent the push rod 61 to prevent it from propping against the pedal arm 52. Therefore it is possible to substantially prevent the collision load from being applied to the pedal arm 2.

That is, the push rod 61 has a sufficient strength with respect to a force in the axial direction at the time of normal braking operation. The push rod 61 is provided with an easily-bendable portion 57 to facilitate the push rod 61 to be bent and deformed when the push rod 61 is pushed down by the projection 56 at the front end of the pedal arm 52 at the time of the head-on collision of the vehicle. Therefore, when the projection 56 at the front end of the pedal arm 52 pushes down and bends the push rod 61, it is possible to easily bend and deform the push rod 61, and to effectively prevent the collision load from being applied to the pedal arm 52.

Further, since the projection 56 at the front end of the pedal arm 52 is set such as to approach and abut against the easily-bendable portion 57 when a rearward force is applied to the push rod 61, it is possible to bend and deform the push rod 61 more reliably, and to reliably prevent the collision load from being applied to the pedal arm 52.

In addition, since the projection 56 is provided at its lower end with the pins 59 as the push rod catching portions, even if the position of the push rod 61 is deviated in the lateral direction of the vehicle due to a shock at the time of the head-on collision of the vehicle, it is possible to reliably bend and deform the push rod 61 downwardly, and to enhance the reliability of the operation.

Although the push rod lever is connected to the Master vac in each of the above embodiments, this is not an indispensable structure of course when the brake system does not include the Master vac, and the same effect of the present invention can be obtained only if the push rod lever is extended in the longitudinal direction of the vehicle and is connected to the brake system for operating the same.

The entire contents of a Patent Application No. TOKUGANHEI 10-5090, with a filling date of Jan. 13, 1998 in Japan, and a Patent Application No. TOKUGANHEI 10-4954, with a filling date of Jan. 13, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A brake pedal structure for a vehicle, comprising:
   a pedal bracket provided on a vehicle dash panel;
   a pedal shaft provided on the pedal bracket;
   a pedal arm pivotally supported on the pedal shaft so as to be freely rotatable about the pedal shaft, the pedal arm having a notch;
   a push rod having a pin which is slidably received in the notch to connect the push rod to the pedal arm and to operate a brake system in response to rotation of the pedal arm in a normal state; and
   a projection which is rigid with the pedal arm and synchronously rotatable therewith to directly act on the push rod such that the projection displaces the pin from the notch in a manner which interrupts a transmission of load input at the time of collision.

2. A brake pedal structure for a vehicle according to claim 1, wherein the pedal arm comprises a pedal arm member and a push rod lever, wherein the notch is formed in one of the pedal arm member and the push rod lever and opens downwardly with respect to the vehicle, and wherein the projection pushes the push rod downwardly with respect to the vehicle to release engagement between the notch and the pin when a load input, in a rearward direction of the vehicle, is applied through the push rod at the time of a collision of the vehicle.

3. A brake pedal structure for a vehicle according to claim 2, wherein the push rod lever is integrally connected to the pedal arm member.

4. A brake pedal structure for a vehicle according to claim 2, wherein the notch includes a pin-drop-preventing portion by which the pin is prevented from sliding out of the notch until a load input on the pin in a downward direction of the vehicle exceeds a predetermined value at the time of the collision of the vehicle.

5. A brake pedal structure for a vehicle according to claim 2, wherein the notch opens downwardly and forwardly with respect to the vehicle.

6. A brake pedal structure for a vehicle, comprising:
   a pedal arm arrangement pivotally supported on a shaft;
   a push rod operatively connected to the pedal arm arrangement to operate a brake system in response to rotation of the pedal arm, the push rod including a pin which is received in a notch formed in the pedal arm arrangement and which connects the push rod to the pedal arm arrangement; and a projection which forms part of the pedal arm arrangement and rotates to a position wherein it directly engages the push rod such that the pin is displaced out of the notch and the operative connection between the push rod arrangement and the pedal arm is disconnected from the push rod at the time of collision.

7. A brake pedal structure according to claim 6, wherein the pedal arm arrangement comprises a pedal arm and a push rod lever which is connected to the pedal arm so that relative movement between the pedal arm and the push rod lever is prevented, and wherein the notch is formed in the push rod lever, the notch being so shaped and dimensioned that engagement between the push rod and the projection displaces the pin along the notch.

* * * * *